(12) United States Patent
Holtslag et al.

(10) Patent No.: US 8,226,792 B2
(45) Date of Patent: Jul. 24, 2012

(54) FLOORING PRODUCT WITH INTEGRATED CIRCUITRY AND METHOD FOR ITS MANUFACTURE

(75) Inventors: Antonius Hendricus Maria Holtslag, Eindhoven (NL); Evert Jan Van Loenen, Eindhoven (NL); Georg Sauerlaender, Aachen (DE); Harald Josef Gunther Radermacher, Aachen (DE); Matheus Franciscus Antonius Van Hugten, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 224 days.

(21) Appl. No.: 12/670,873

(22) PCT Filed: Jul. 28, 2008

(86) PCT No.: PCT/IB2008/053018
§ 371 (c)(1),
(2), (4) Date: Jan. 27, 2010

(87) PCT Pub. No.: WO2009/019625
PCT Pub. Date: Feb. 12, 2009

(65) Prior Publication Data
US 2010/0206473 A1 Aug. 19, 2010

(30) Foreign Application Priority Data
Aug. 3, 2007 (EP) .................................... 07113751

(51) Int. Cl.
*B29C 65/00* (2006.01)
*B03B 37/14* (2006.01)
*B32B 37/00* (2006.01)
*B32B 38/04* (2006.01)

(52) U.S. Cl. ........ 156/264; 156/270; 156/91; 52/745.05

(58) Field of Classification Search .................. 156/264, 156/270, 91; 52/745.05
See application file for complete search history.

(56) References Cited

U.S. PATENT DOCUMENTS
2008/0121263 A1* 5/2008 Schutte et al. ................. 136/203

FOREIGN PATENT DOCUMENTS

| | | |
|---|---|---|
| EP | 1469141 A1 | 10/2004 |
| JP | 200000822 | 1/2000 |
| JP | 2006127993 | 5/2006 |
| JP | 2006154566 | 6/2006 |
| WO | 0075417 A1 | 12/2000 |
| WO | 03042596 A1 | 5/2003 |
| WO | 2005024323 A1 | 3/2005 |
| WO | 2005071597 A1 | 8/2005 |
| WO | 2005083800 A1 | 9/2005 |

* cited by examiner

*Primary Examiner* — Linda L Gray
(74) *Attorney, Agent, or Firm* — Mark L. Beloborodov

(57) ABSTRACT

A method for manufacturing a flooring product with integrated circuitry, comprising the steps of providing a plurality of pieces (6), stacking said pieces on top of each other, displaced in relation to each other to form an offset stack (10), and compressing said offset stack to form said flooring product. The method further comprises arranging flexible circuitry (7) on an upper surface of at least one piece, so that, when said pieces are stacked, a first portion (7a) of flexible circuitry on the at least one piece is exposed, said first portion (7a) including circuitry for interacting with the environment. By arranging the circuitry in the flooring during such a manufacturing process, a flooring product is achieved where only a portion of the circuitry is exposed, and another portion is embedded in the flooring. This allows for exposing those parts of the circuitry that are adapted to interact with the surrounding environment, such as optical components, pressure sensitive components, acoustic components, etc.

8 Claims, 3 Drawing Sheets

FLOORING PRODUCT WITH INTEGRATED CIRCUITRY AND METHOD FOR ITS MANUFACTURE

FIELD OF THE INVENTION

The present invention relates to a flooring product with integrated circuitry and a method of manufacturing such a flooring product.

BACKGROUND OF THE INVENTION

Recently, it has been proposed to arrange circuitry interacting with the environment, such as light emitting components, on various surfaces such as floors. As an example, WO2005/083800 discloses an electronic safety and marking device, in the form of a laminated flexible product. The product can be applied directly from a roll onto an existing surface.

However, when using the device according to WO2005/083800 to arrange circuitry such as light emitting devices on a floor, the laminated flexible product must be applied in an additional step, after the flooring has been laid. This leads to a time consuming process. Also, it may be problematic to achieve sufficient adhesion between the flooring and the laminated flexible product, especially on floors subject to extensive wear.

SUMMARY OF THE INVENTION

Therefore, it is an object of the present invention to at least partly overcome this problem.

This object is achieved by a method for manufacturing a flooring product with integrated circuitry, comprising the steps of providing a plurality of pieces, stacking said pieces on top of each other, displaced in relation to each other to form an offset stack, compressing said offset stack to form said flooring product, and arranging flexible circuitry on an upper surface of at least one piece, so that, when said pieces are stacked, a first portion of flexible circuitry on the at least one piece is exposed, this first portion including circuitry for interacting with the environment.

By arranging the circuitry in the flooring during such a manufacturing process, a flooring product is achieved where only a portion of the circuitry is exposed, and another portion is embedded in the flooring. This allows for exposing those parts of the circuitry that are adapted to interact with the surrounding environment, such as optical components, pressure sensitive components, acoustic components, etc.

In order to allow the further processing of the flooring product, the circuitry is flexible. This means that the circuitry will not be damaged by any rolling or deformation taking place after its application. Note that this requirement is not very significant, and the flexibility may be rather limited, as long as the circuitry is not damaged.

A flooring product manufactured according to the invention can be applied using more or less conventional techniques, and results in a flooring with integrated interacting capabilities, such as optics, acoustics, vibration.

According to one embodiment, the pieces are provided by forming a composition into a flat strip, and effecting a plurality of parallel cuts extending across said strip. In this case, the pieces are preferably displaced in relation to each other in a direction parallel to said cuts, to form an offset stack. The step of arranging flexible circuitry can be performed before the cuts are effected.

The first portion can be arranged along a longitudinal edge of the strip. This means that for a separated piece, the first portion extends along an edge that has not been cut, and ensures that the portion will be exposed, when the separated pieces are displaced.

A second portion of flexible circuitry on each piece may be covered by an overlying piece in said stack, and this second portion may include control circuitry. This means that other parts of the circuitry, which typically does not need to be exposed, such as control circuitry, may be embedded and hidden in the flooring.

In order to reduce the thickness of the flooring product, a second portion of a first piece can be displaced in relation to a second portion of a second piece in the longitudinal direction of said strip. When the pieces are displaced during stacking, the respective second portions will be displaced in two different directions, ensuring fewer overlaps between control circuitry of such second portions.

According to one embodiment of the present invention, light emitting elements are integrated in a linoleum flooring product.

The object is also achieved by a flooring product comprising a substrate of a material suitable for use as flooring, and flexible circuitry integrated into said substrate, the circuitry including exposed portions having circuitry for interacting with the environment. The circuitry can be arranged in a plurality of layers, each layer at least partly overlapping, and in electrical contact with, another layer.

It is noted that the invention relates to all possible combinations of features recited in the claims.

BRIEF DESCRIPTION OF THE DRAWINGS

This and other aspects of the present invention will now be described in more detail, with reference to the appended drawings showing a currently preferred embodiment of the invention.

DETAILED DESCRIPTION

The present invention will be described with reference to FIGS. 1-2, which show a process for manufacturing a linoleum flooring according to an embodiment of the present invention.

According to a process known per se, a granulate composition 1 comprising linseed oil (linoxyn) and e.g. wood flour is prepared. Typically, the composition also comprises color pigment, and granulates of different color are used to create a marble pattern.

Figure 1:
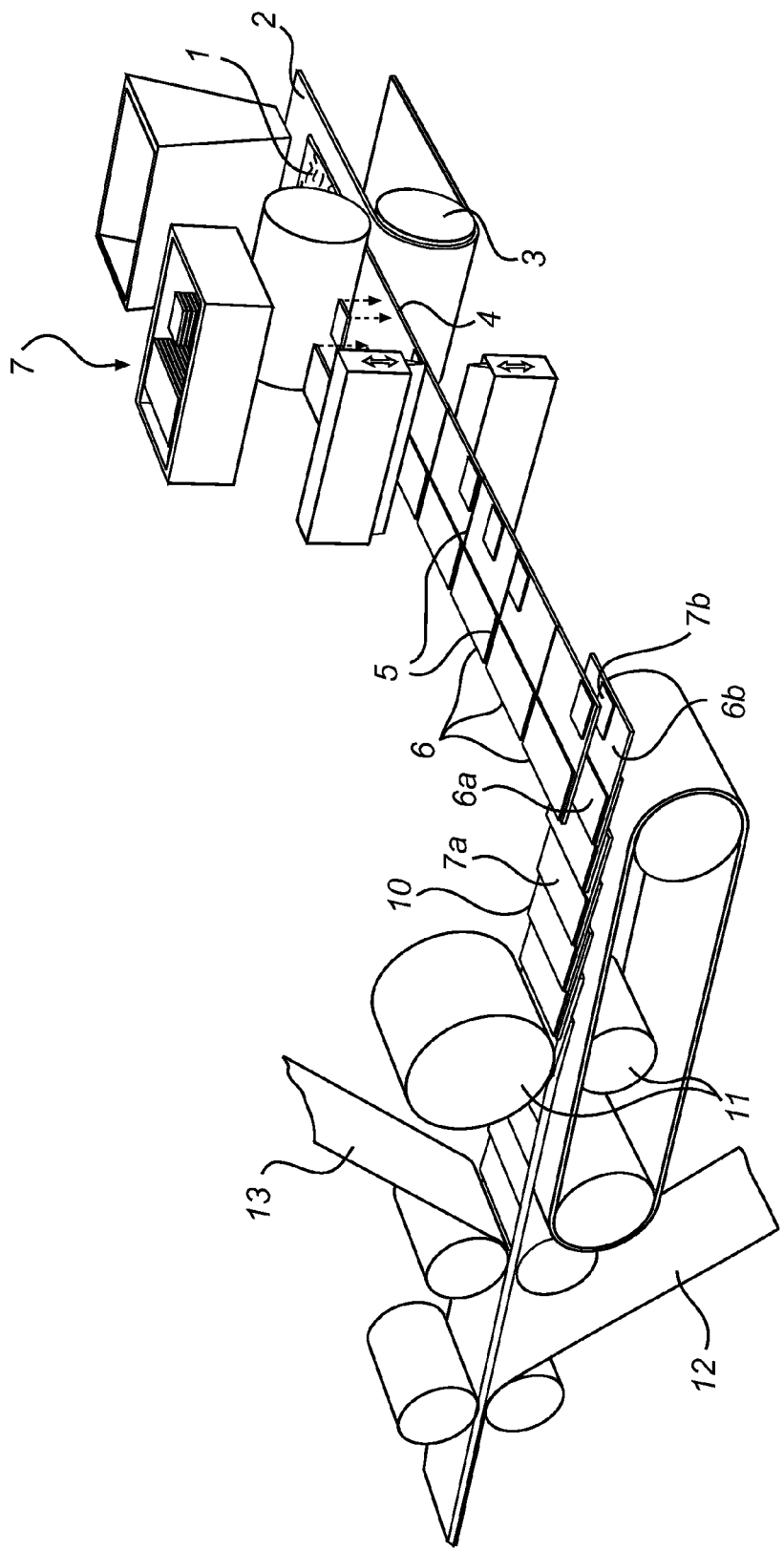
FIG. 1 show a process for manufacturing a linoleum flooring according to an embodiment of the present invention.
Figure 2:
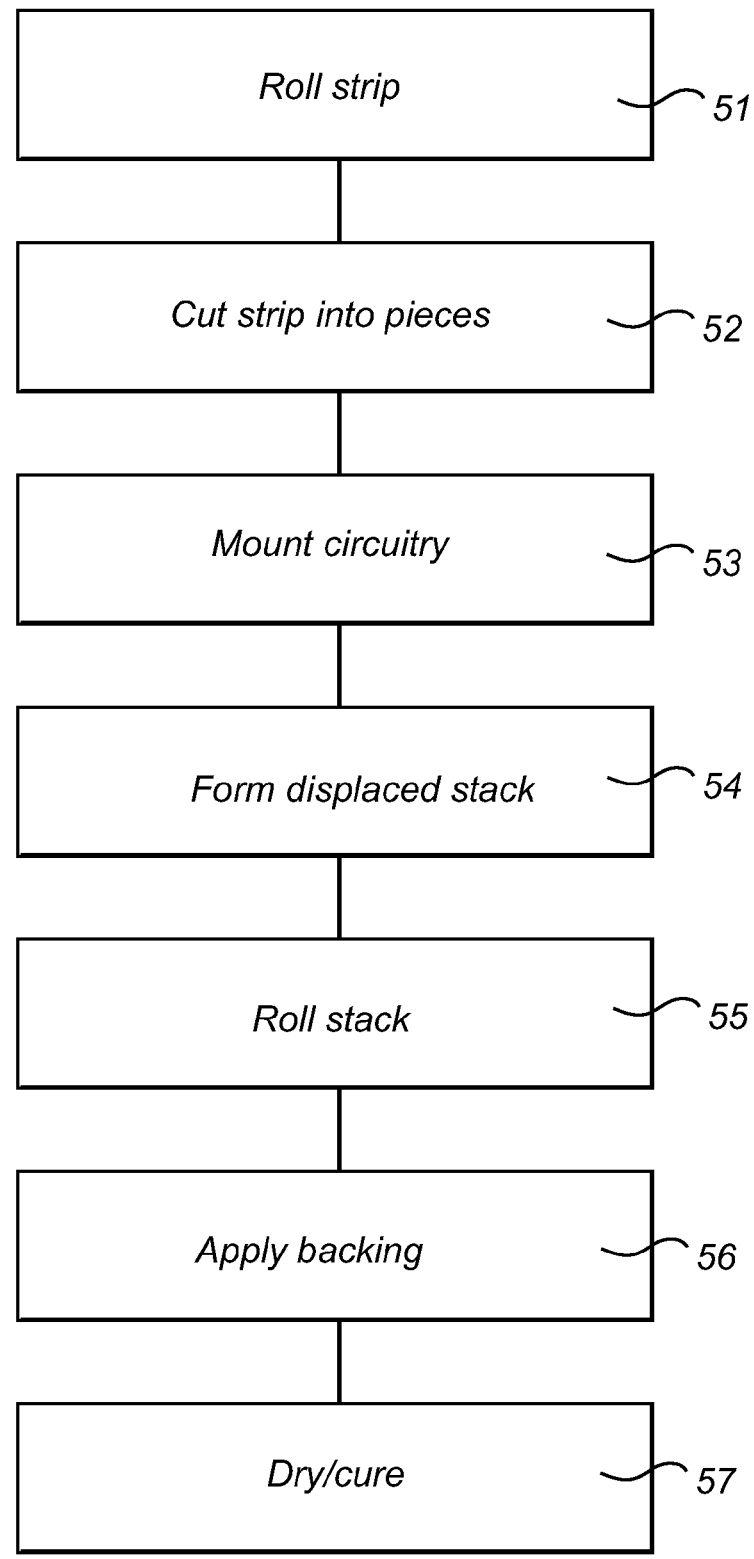
FIG. 2 shows a flow chart of the process in FIG. 1.

In FIG. 1, corresponding to step S1 in FIG. 2, the granulate mix 1 is deposited on a conveyor 2 and rolled flat by rollers 3 to form a first strip 4. The longitudinal edges of the strip 4 are preferably cut to form a wave pattern. The strip 4 is then in step S2 separated into consecutive pieces 6 along parallel cuts 5 across the strip 4. The cuts may be effected by cutting, punching, or by any other suitable process.

During rolling, either before or after cutting, flexible electrical circuitry 7 is mounted to the upper side of the strip 4 in step S3. The circuitry 7 includes circuitry for interacting with the environment, and preferably also control circuitry. It may also include power supply components, such as batteries and/or solar cells. The interacting circuitry may include optical components, such as light emitting elements and light sensing elements, but may also include pressure sensors, electroacoustic transducers for generating or detecting sound, etc. Also, if the circuitry includes solar cells, these are obviously part of the interacting circuitry.

Figure 3A:
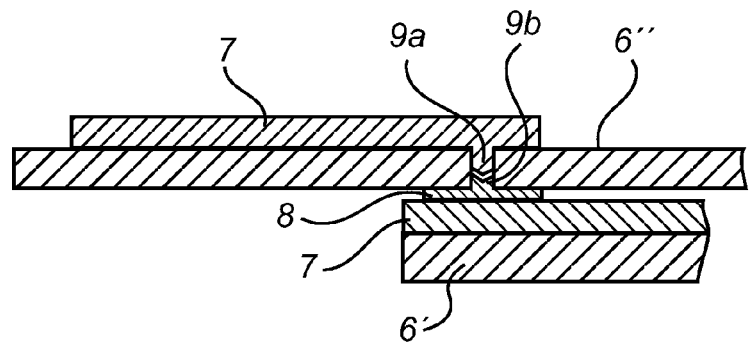
FIG. 3a-c show three examples of how electrical contact is ensured between circuitry on different pieces in FIG. 1.

Optionally, additional flexible electrical circuitry 8 is mounted on the opposite side of the strip 4. Such circuitry may be connected with the circuitry on the upper side, e.g. by protrusions 9a adapted to be pressed through the strip and received by cooperating protrusions and/or grooves 9b on the other side, as indicated in FIG. 3a.

In step S4, the separated pieces 6 are arranged on top of each other, displaced in a direction essentially parallel to the direction of the cuts 5, to form an offset stack 10. In the illustrated example, where the cuts are substantially perpendicular to the longitudinal extension of the strip 4, the pieces 6 are thus displaced in a direction perpendicular to the rolling direction.

As a consequence of the displaced stacking, a portion 6a of each piece and a portion 7a of the circuitry 7 is exposed while another portion 6b of each piece and another portion 7b of the circuitry 7 is covered by the piece placed on top. The exposed circuit portion 7a includes at least a part of the interacting circuitry, thus allowing interaction with the environment. The covered circuit portion 7b preferably comprises a majority of any control circuitry.

In step S5, the offset stack 10, with the embedded circuitry 7a, 7b, is then compressed, e.g. rolled by rollers 11, to desired thickness. In case of wave formed edges, these contribute to seamless integration of the pieces. In step S6, a backing 12, e.g. canvas or burlap, is attached to the backside of the pressed flooring. If required, the backing may be prepared with a thin layer of waste granulate composition 1 acting as a primer, to ensure satisfactory adhesion. The flooring is then hung up to dry and cure in step S7.

If necessary, the flooring may be provided with a protective layer 13 to protect the exposed circuitry. Such a layer may then be laminated on the flooring before or after the backing 12, and in fact, even after the curing step.

As illustrated in FIG. 1, the position of the circuitry 7b that is to be covered by an overlying piece may be displaced relative to the circuitry 7b of adjacent pieces 6 in the longitudinal direction of the strip. In the illustrated example, the circuitry 7b is shifted between three positions; left, right and middle. This provides for an improved spatial distribution of circuitry across the displaced stack 10, thus allowing a tighter compression of the stack during the consecutive rolling step.

As mentioned above, and with reference to FIG. 3a, circuitry 7, 8 arranged on both sides of the pieces 6 may be brought into electrical contact by means of protruding terminals 9a extending into the linoleum 1 and pushed into contact with receiving terminals 9b. Electrical contact between an underlying piece 6' and an overlying piece 6" can then easily be ensured by ensuring contact between circuitry facing each other.

Figure 3B:
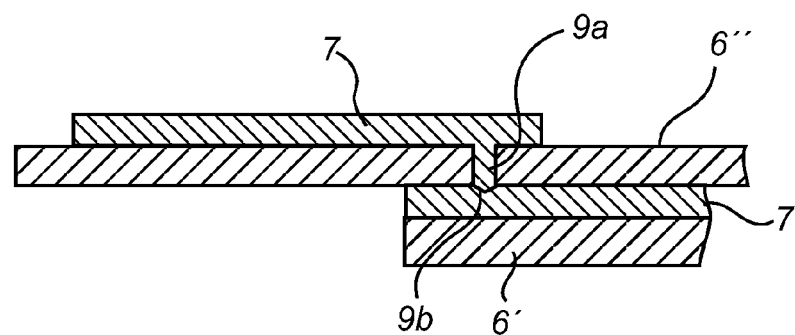

With reference to FIG. 3b, if circuitry 7 is only arranged on the upper side, electrical contact between pieces can be ensured in a similar fashion, by protruding terminals 9a of the circuitry 7 of an overlying piece 6" extending into the linoleum 1 and pushed into contact with receiving portions 9b in the circuitry 7 of an underlying piece 6'.

Figure 3C:
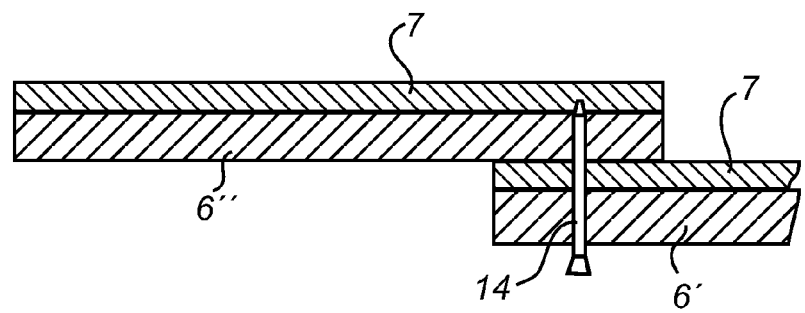

Alternatively, contact pins 14 may be inserted into the displaced stack from underneath. Such pins may provide electrical contact between the circuitry 7 on several pieces 6', 6", as indicated in FIG. 3c.

During the rolling process in step S5, the electrical contact between different circuits can be secured and stabilized. For example, any contacts protruding through the paste will be more firmly pressed into contact with underlying or overlying circuitry. The contacting portions of the circuitry, such as the contact pins in FIG. 3c, may also be deformable, so as to allow for further compression during the rolling step S5.

According to one embodiment, the circuitry 7 may comprise side-emitting LEDs or flexible OLEDs, mounted in holes in a thin plastic carrier-foil, e.g. with a total thickness of 0.2 mm. The LEDs thus emit light into the thin foil. The foil preferable contains on the bottom side a mirror of metal or titanium oxide powder, in order to increase the light output. On the upper side fo the foil, outcoupling structures such as V-grooves or dots are located. If a light emission patter is desired, such as text, the outcoupling structures are arranged to coincide with the desired pattern. If homogeneous illumination is desired, the outcoupling structures are distributed homogeneously. On top of the foil another foil may be laminated to protect the components.

The LEDs can be connected to a power supply via a switch. The power supply can be an internal power supply such as a solar cell or a battery, preferably in the shape of a thin flexible foil. Optionally, the battery can be connected with a loop, such that with an external positioned counter-loop a transformer is realised which allows to externally recharged the battery with an AC-voltage (without making mechanical contact). The external loop can be positioned by human beings or with robots driving along all light generating devices. Alternatively, the power supply is external, such as the mains.

If a metal layer is used as reflector under the carrier foil, the same layer can be used for the electrical connection of the + and − of the LEDs. The + connections are electrical disconnected from the large − electrode, by isolating air gaps.

The switch can be a stack of two thin foils with on the inner faces a metal layer, which make electrical contact as soon a person steps on it. Then a circuit is activated which ensures that the LEDs emit light during a limited amount of time and then the LED's are turned of. In order to guarantee that a person hits the switch when passing by, the switch could be composed of a network of smaller switches. The total switch area can be an area of e.g. 0.5 m×0.5 m.

The person skilled in the art realizes that the present invention by no means is limited to the preferred embodiments described above. On the contrary, many modifications and variations are possible within the scope of the appended claims. For example, other flooring than linoleum may be manufactured according to the described method, and be provided with embedded circuitry.

The invention claimed is:

1. A method for manufacturing a flooring product with integrated circuitry, comprising the steps of:
    providing a plurality of pieces;
    stacking said pieces on top of each other, displaced in relation to each other to form an offset stack;
    compressing said offset stack to form said flooring product; and
    arranging flexible circuitry on an upper surface of at least one piece, so that, when said pieces are stacked, a first portion of flexible circuitry on the at least one piece is exposed, said first portion including circuitry for interacting with the environment,
    wherein said pieces are provided by:
        forming a composition into a flat strip,
        effecting a plurality of parallel cuts extending across said strip, and wherein said pieces are displaced in relation to each other in a direction parallel to said cuts, to form the offset stack.

2. The method of claim 1, wherein said circuitry is arranged on said flat strip before said cuts are effected.

3. The method of claim 1, wherein said first portion is arranged along a longitudinal edge of said strip.

4. A method for manufacturing a flooring product with integrated circuitry, comprising the steps of:
provide a plurality of pieces;
stacking said pieces on top of each other, displaced in relation to each other to form an offset stack;
compressing said offset stack to form said flooring product; and
arranging flexible circuitry on an upper surface of at least one piece, so that, when said pieces are stacked, a first portion of flexible circuitry on the at least one piece is exposed, said first portion including circuitry for interacting with the environment, wherein said flexible circuitry is arranged so that, when said pieces are stacked, a second portion of flexible circuitry on an underlying piece is covered by an overlying piece in said stack.

5. The method of claim 4, wherein said second portion includes control circuitry.

6. The method of claim 4, wherein said second portion includes power supply components.

7. The method of claim 4, wherein a second circuitry portion of a first piece is displaced in relation to a second circuitry portion of a second piece in the longitudinal direction of said strip.

8. A method for manufacturing a flooring product with integrated circuitry, comprising the steps of:
providing a plurality of pieces;
stacking said pieces on top of each other, displaced in relation to each other to form an offset stack;
compressing said offset stack to form said flooring product;
arranging flexible circuitry on an upper surface of at least one piece, so that, when said pieces are stacked, a first portion of flexible circuitry on the at least one piece is exposed, said first portion including circuitry for interacting with the environment; and
applying contact enabling elements through said offset stack to secure electrical contact between circuitry on adjacent pieces.

* * * * *